United States Patent
Milligan, Jr. et al.

(10) Patent No.: US 6,853,751 B1
(45) Date of Patent: Feb. 8, 2005

(54) LOCATION OF GENERALLY RECTANGULAR SHAPED OBJECTS IN AN IMAGE

(75) Inventors: Robert Milligan, Jr., Maynard, MA (US); Ivan Bachelder, Newton, MA (US)

(73) Assignee: Cognex Technology and Investment Corporation, Mt. View, CA (US)

( * ) Notice: Subject to any disclaimer, the term of this patent is extended or adjusted under 35 U.S.C. 154(b) by 786 days.

(21) Appl. No.: 09/688,205

(22) Filed: Oct. 16, 2000

Related U.S. Application Data

(60) Provisional application No. 60/193,887, filed on Mar. 31, 2000.

(51) Int. Cl.[7] .................................................. G06K 9/48
(52) U.S. Cl. ...................... 382/199; 382/201; 382/203; 382/209
(58) Field of Search ............................... 382/103, 141, 382/151, 199, 201, 203, 209, 289, 291

(56) References Cited

U.S. PATENT DOCUMENTS

| | | | |
|---|---|---|---|
| 4,504,969 A | * 3/1985 | Suzuki et al. | 382/175 |
| 5,189,707 A | * 2/1993 | Suzuki et al. | 382/151 |
| 5,371,690 A | * 12/1994 | Engel et al. | 382/151 |
| 5,574,801 A | * 11/1996 | Collet-Beillon | 382/150 |
| 5,694,482 A | * 12/1997 | Maali et al. | 382/151 |
| 6,078,700 A | * 6/2000 | Sarachik | 382/291 |
| 6,549,648 B1 | * 4/2003 | Rinn | 382/151 |

OTHER PUBLICATIONS

Brito, et al. "Segmentation strategies with multiple analysis for an SMD object recognition system", IEEE, pp. 59–64, 1998.*

* cited by examiner

Primary Examiner—Daniel Miriam
(74) Attorney, Agent, or Firm—Russ Weinzimmer

(57) ABSTRACT

A rectangle finder tool automatically locates rectangles in an image that correspond to substantially rectangular devices in the image. The rectangle finder tool can be used to automatically locate rectangles in an image or to generate abstract rectangular models of devices in the image. The tool determines the properties of and locates the rectangular device by searching for pairs of lines in an image at a specified orientation.

18 Claims, 7 Drawing Sheets

LOCATION OF GENERALLY RECTANGULAR SHAPED OBJECTS IN AN IMAGE

RELATED APPLICATION DATA

The present application claims priority to U.S. Provisional application No. 60/193,887 entitled A METHOD FOR THE AUTOMATIC CHARACTERIZATION OF RECTANGULAR BODIED SURFACE MOUNT DEVICES, filed Mar. 31, 2000.

BACKGROUND OF THE INVENTION

1. Field of the Invention

Aspects of the present invention relate to machine vision systems, and more particularly, to machine vision systems for locating rectangular shaped objects.

2. Description of Background Information

In many manufacturing processes, machine vision systems are used to automate the assembly and production process. In the semiconductor industry, for example, machine vision systems are commonly used in mounting and inspecting electronic components. In particular, electronic devices, such as semiconductor chips and resistors, are often mounted on the surface of printed circuit boards. The electronic devices, called surface mounted devices (SMDs), are mounted on the circuit board using machine vision based guidance to ensure that the device is placed at the proper position and in the proper orientation on the circuit board.

An initial step in mounting SMDs using a machine vision system involves capturing an image including the SMD and then locating the SMD in the image. Locating and finding the orientation of the SMD may be performed with a search algorithm such as the well known normalized correlation search algorithm. Before the normalized search can locate a particular SMD, however, it must be trained for the SMD. Typically, training involves inputting an abstract model to the search algorithm, thus giving the search algorithm a description of the device it is supposed to locate.

One important facet of the SMD abstract model is a description of the body of the SMD. Often the position and orientation of an SMD body serve as an indication of the position and orientation of more critical elements of the SMD, such as leads or solder balls on the SMD.

Many SMDs have generally rectangular shaped bodies. Accordingly, the abstract model of these rectangular SMDs contains length and width information of the rectangle.

The descriptions of the SMD bodies may come from a variety of sources. CAD (computer aided design) data, if available, may be used. Alternatively, an operator may manually measure the dimensions of the SMD. CAD data, however, is often unavailable, and manual measurement can be clumsy and imprecise.

Accordingly, there is a need in the art to improve the process of locating and characterizing rectangular shaped bodies in an image.

BRIEF DESCRIPTION OF THE DRAWINGS

The above and other objects, features, and advantages of the present invention are further described in the detailed description which follows, with reference to the drawings by way of non-limiting exemplary embodiments of the present invention, wherein like reference numerals represent similar parts of the present invention throughout the several views and wherein.

DETAILED DESCRIPTION

Reference will now be made in detail to embodiments of the invention, examples of which are illustrated in the accompanying drawings. Wherever possible, the same reference numbers will be used throughout the drawings to refer to the same or like parts.

As described herein, a rectangle finding tool automatically locates and/or characterizes properties of a rectangular device such as its length and width. One use for the tool is in automatically creating a rectangular search model from image data. More generally, however, the tool can be used to locate and describe objects in an image that have a generally rectangular shape.

Figure 1:
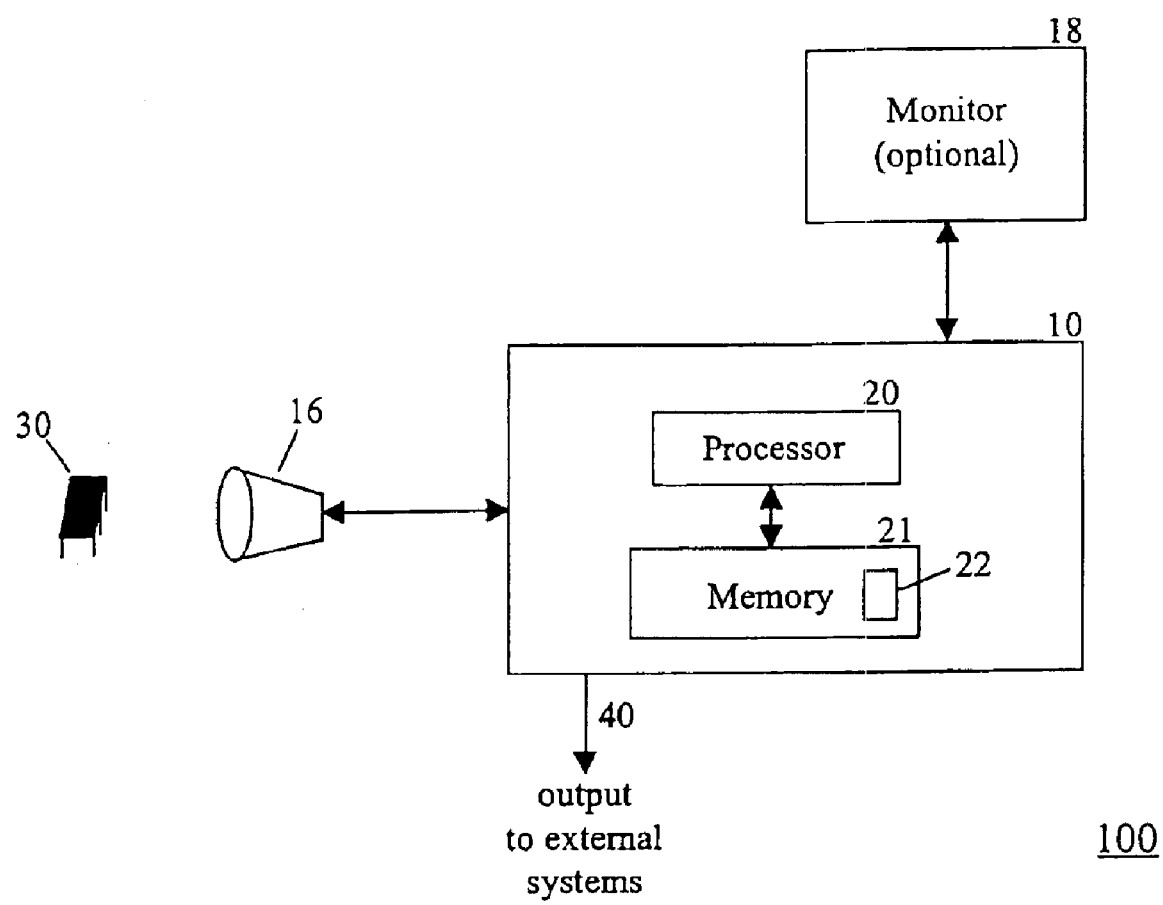
FIG. 1 is a block diagram illustrating a machine vision system.

FIG. 1 is a block diagram illustrating an illustrative machine vision system 100. Machine vision system 100 includes a processing unit 10 connected to an image formation unit 16 (e.g., a CCD camera, an X-ray sensor, a Scanning Electron Microscope) and an optional monitor 18. Processing unit 10 includes a processor 20 and computer readable memory 21, such as dynamic random access memory (DRAM).

Images taken with image formation unit 16, such as images of an SMD 30, are transferred to the processing unit 10. Processor 20 implements programs in memory 21 that perform intelligent functions on the received image. For example, using previously trained abstract model data stored in memory 21, processor 20 may locate the position and alignment of SMD 30 in the received image. Processing unit 10 can communicate its results to external devices via output line 40. For example, the calculated position and alignment data may be input to another machine, such as robotic placement arm that uses this information to correctly mount the SMD in its circuit board. Processing unit 10 can also perform other operations on the received images, such as analyzing the identified SMD 30 for defects.

One of ordinary skill in the art will recognize that many different suitable implementations for image formation unit 16, memory 21, and processor 20 are possible. Processor 20, may be, for example, one of number of processors manufactured by Intel Corporation, of Santa Clara, Calif.

The rectangle finding tool described herein may be implemented as a program in memory 21, illustrated as rectangle finding tool program 22, that is executed by processor 20. However, one of ordinary skill in the art will recognize that rectangle finding tool 22 can be implemented by virtually any computer processor, whether or not it is arranged in the configuration shown in FIG. 1.

The operation of machine vision system 100 in locating and characterizing rectangular shaped objects in images taken by image formation unit 16 will next be described. The objects may be located in training images, and the resultant characterizations of the rectangular shaped objects used as abstract models through which a suitably chosen object location program can be trained. Alternatively, vision system 100 can be used to locate rectangular shaped objects in images taken at run-time.

Figure 2:
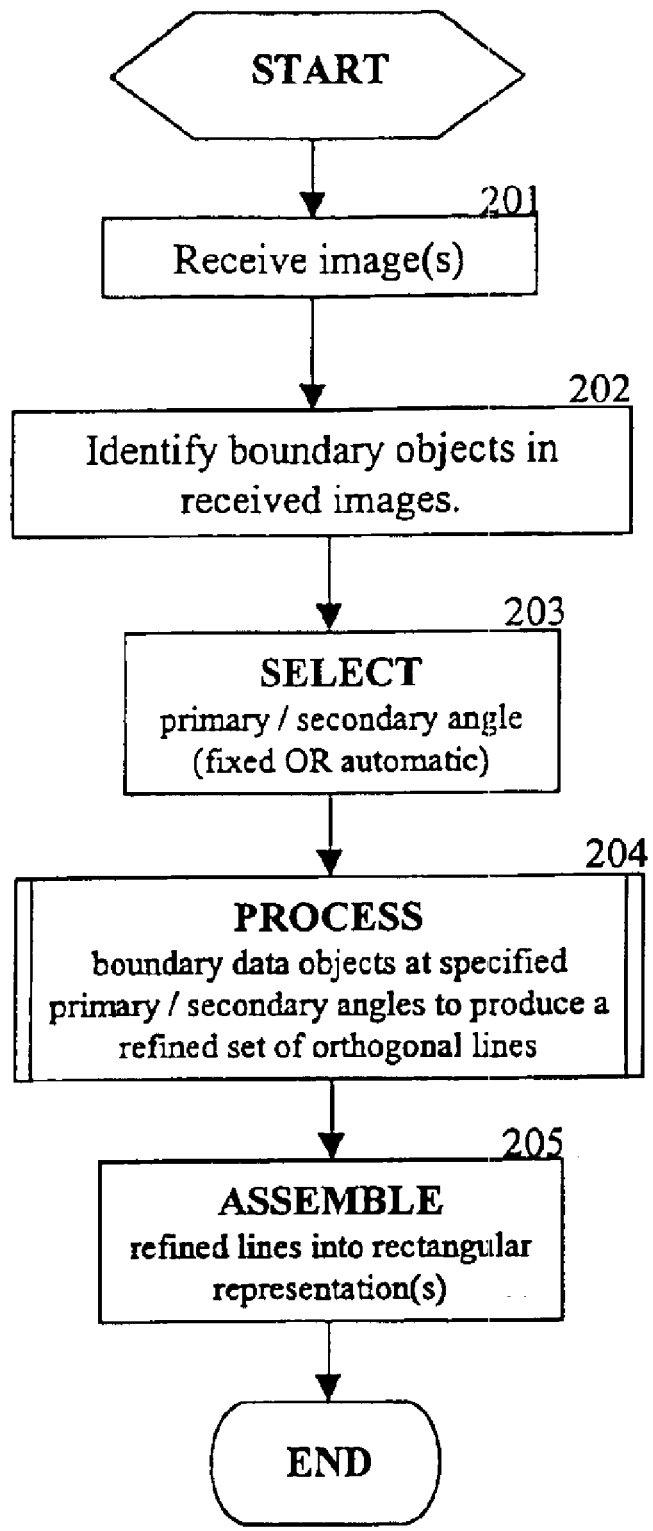
FIG. 2 is a flow chart illustrating methods consistent with the present invention for locating rectangles in a plane using a rectangle finer tool.
Figure 3A:
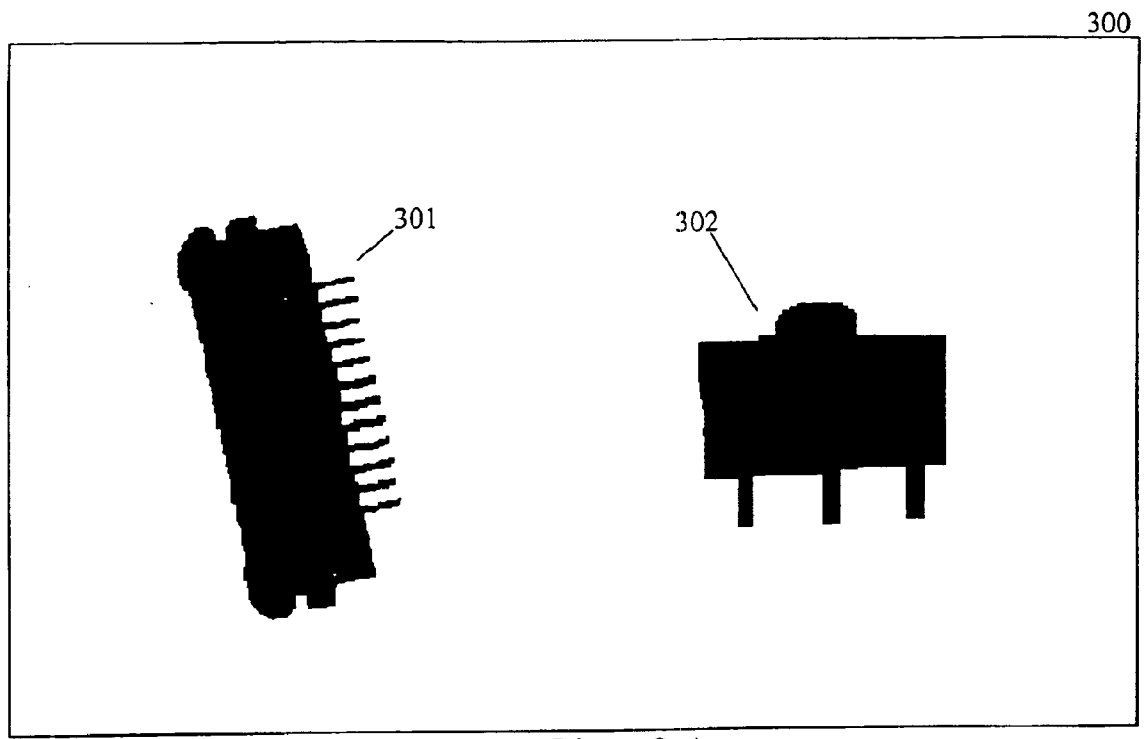
FIGS. 3A and 3B are images illustrating exemplary objects and the corresponding boundary versions of these objects.
Figure 3B:
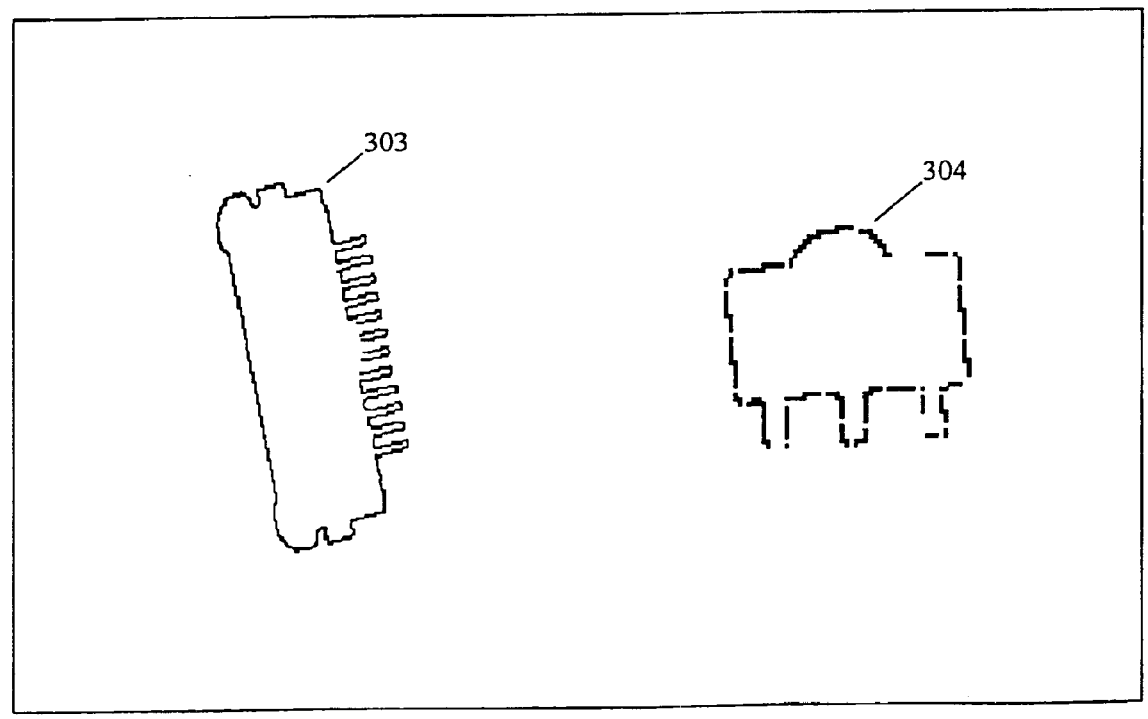

FIG. 2 is a high level flow chart illustration methods used by the rectangle finder tool 22 to locate and characterize rectangles in an image. An image to be processed is first received by rectangle finder tool 22, (Act 201), and boundary objects identified in the image. (Act 202). A boundary object is a simplified version of an object that highlights features along the perimeter of the object. FIG. 3A is an illustration of an image 300, having two objects 301 and 302. Boundary objects 303 and 304, corresponding to objects 301 and 302, respectively, are shown in FIG. 3B.

Generating boundary objects from an image is generally well known in the art. For example, gradient-based (Sobel) edge detection algorithms, blob processing algorithms, or boundary tracking algorithms are all well known techniques for generating boundary objects.

By definition, a rectangle is constructed from two pairs of parallel lines that are orthogonal to one another. The angle of orientation of the longer, "dominant," edge of the rectangle is considered to be the primary angle of the rectangle. The angle of orientation of the other edge of the rectangle is considered to be the secondary angle of the rectangle. The primary and secondary angles are orthogonal to one another. In Act 203, primary and secondary angles are selected, either automatically by rectangle finder tool 22 or manually entered by a user.

Based on the identified boundary objects and on the primary/secondary angle specified in Act 203, the rectangle finder tool 22 generates a set of orthogonal lines corresponding to edges at the primary and secondary angles in the boundary objects. (Act 204, discussed in more detail with reference to FIG. 4). Finally, the generated set of lines are assembled into line segments that define the edges of the rectangular shaped object. (Act 205). Characteristics of the rectangle, such as the length, width, position, and orientation of the rectangle, may be output by rectangle finder 22.

Figure 4:
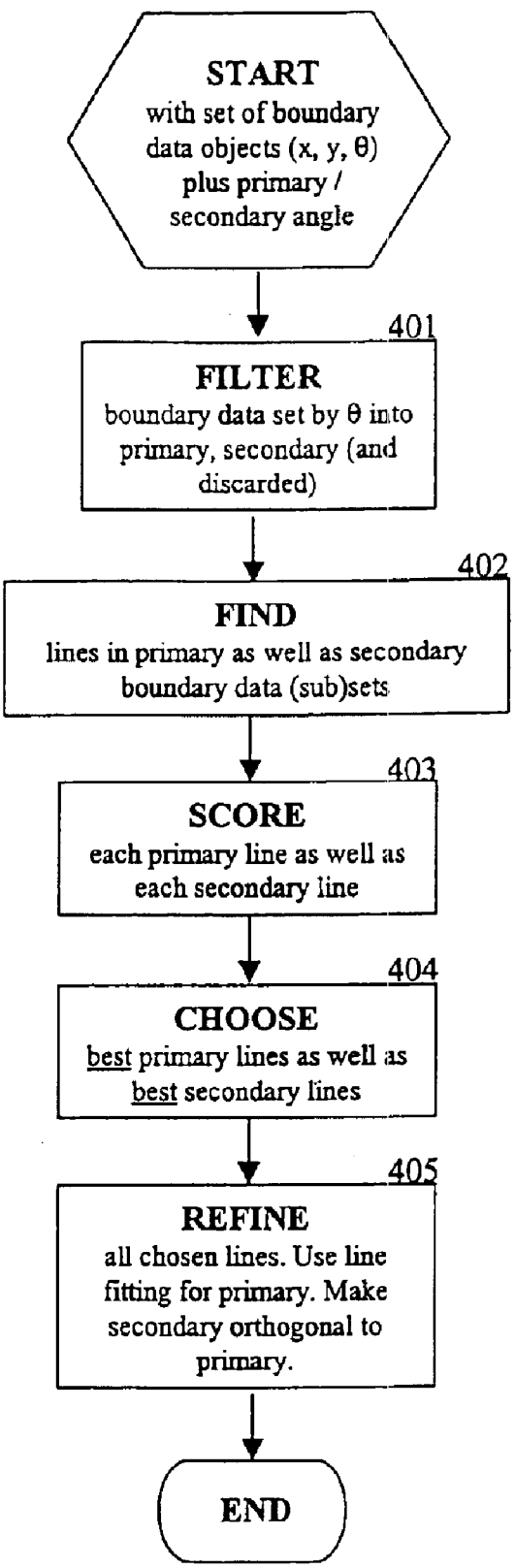
FIG. 4 is flow chart illustrating the location of orthogonal lines in an image.

FIG. 4 is a flow chart illustrating, in detail, the method performed in Act 204 of FIG. 2. Boundary objects, such as boundary objects 303 and 304, are each composed of a plurality of points, each having a position, specified by x and y values, and an orientation ($\Theta$). The value of the orientation, $\Theta$, of a point is determined by the context of the point in relation to its surrounding points. Techniques for determining the orientation $\Theta$ of a point are well known in the art. Each point, defined by its x, y, and $\Theta$ value, is referred to herein as a boundary data object.

Figure 5A:
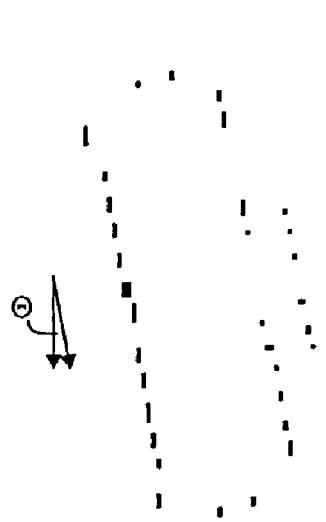
FIGS. 5A and 5B are images of boundary data objects having specified orientations.
Figure 5B:
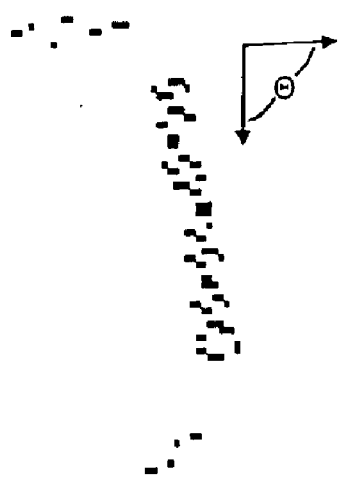

A complete set of boundary data objects, such as all the boundary data objects in boundary object 303, are filtered by rectangle finder tool 22. (Act 401). More particularly, from the complete set of boundary data objects, rectangle finder tool 22 creates a sub-set of boundary data objects that have orientations $\Theta$ that are close to the selected primary angle (or the primary angle plus 180 degrees). Similarly, a second sub-set of boundary data objects is created that have orientations that are close to the secondary angle. The remaining boundary data objects, which do not have angles of orientation near either the primary or secondary angle, are not used in further processing. FIG. 5A is an illustration of the boundary data objects of boundary object 303 that have orientations in the primary orientation of the object. Similarly, FIG. 5B is an illustration of the boundary data objects of boundary object 303 that have orientations in the secondary orientation of the object.

From the first and second sub-sets of boundary data objects, rectangle finder 22 extracts straight lines. (Act 402). More particularly, groups of boundary data objects that fall along a line are classified as belonging to that line. Multiple lines in each subset of boundary data objects would generally be found, each potentially containing different numbers of points.

Figure 6:
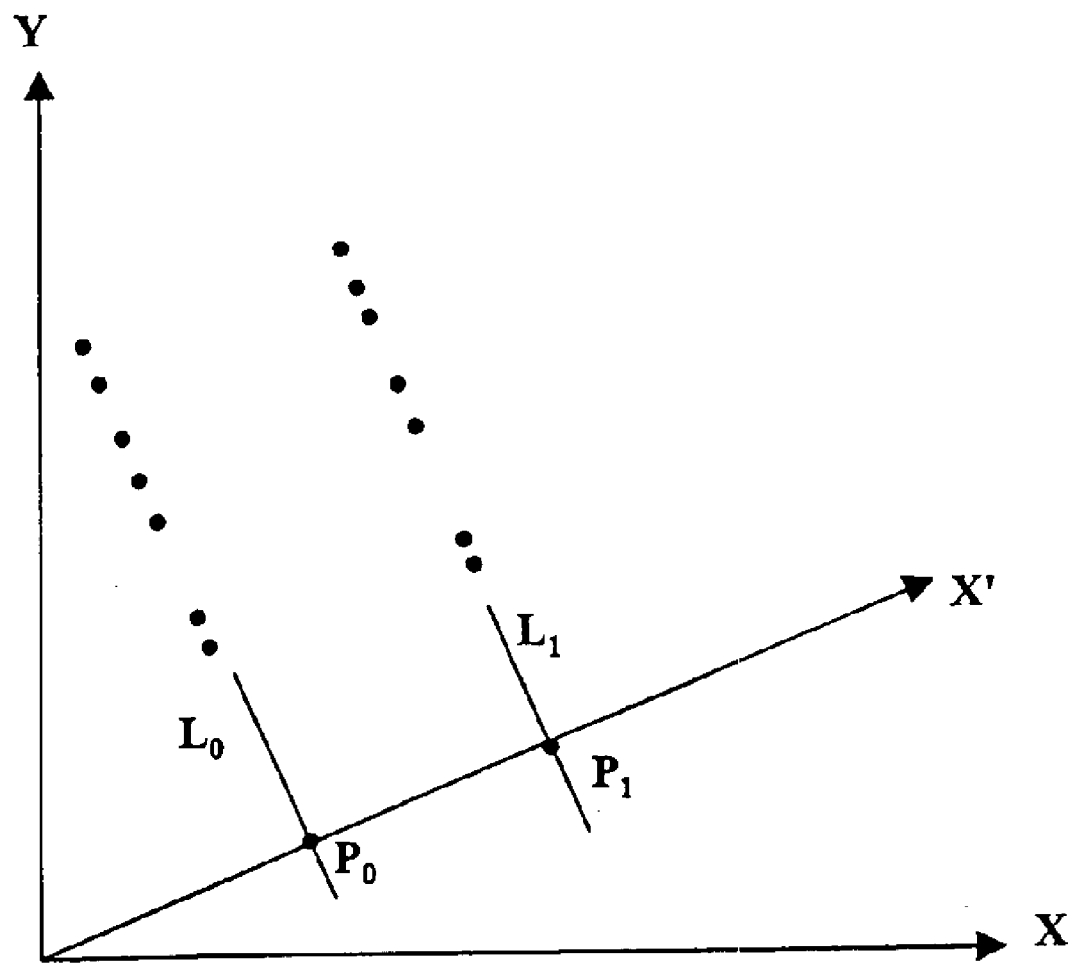
FIG. 6 is a diagram illustrating projection of points onto an alternate axis.

Methods for locating groups of boundary data objects falling around a line having a particular slope are known in the art. One such method is described in U.S. Pat. No. 6,075,881, the contents of which are hereby incorporated by reference. As is generally described in this patent, points in a plane are projected onto an alternate axis X'. Areas on the alternate axis X' having a projected point density greater than a threshold are considered to correspond to a line. Projection of points along two lines, labeled $L_1$ and $L_2$, onto an axis X', is illustrated in FIG. 6.

Rectangle finder 22 next scores each line from the first and second sub-sets based on the likelihood that the line actually corresponds to a side of a rectangle. (Act 403). One way to do this is to generate the score based on how many boundary data objects contribute to the line. The more boundary data objects that contribute to the line, the higher the line score. Lines having scores below a predetermined threshold may be discarded.

In Act 404, the rectangle finder tool chooses the "best" lines from the primary and secondary lines that were identified in Act 403. These lines correspond to the line segments that make up the sides of a rectangle.

A number of different methods may be used to choose the best lines from the primary and the secondary lines. In one implementation, rectangle finder tool 22 assumes that there is only one rectangle in the image. The span between the outermost lines is bisected. The lines to the left of the bisector are considered and the line with the highest score is chosen as the "left" line. The lines to the right of the bisector are then considered and the line with the highest score is deemed the "right" line. The process is then performed for the secondary lines.

The process discussed in the previous paragraph may be extended to situations where multiple rectangles are present in the image. One way of implementing this is to have rectangle finder tool 22 compute all four-line combinations from the lines in the primary and secondary set, with each combination containing a pair of lines from the primary and a pair of lines from the secondary set. For each of the combinations, compute a rectangle by finding the points of intersection of the four lines that make up the combination. The points of intersection define the corners of the potential rectangle. For each potential rectangle, a rectangle score is computed as the percentage of the rectangle perimeter that falls on boundary data objects in the image. Combinations with rectangle scores above a preset threshold are considered to be valid rectangles.

Variants of this algorithm might be devised in order to streamline the computation. For example, it may be possible to request only rectangles with a certain polarity (e.g. dark on a light background, or light on a dark background). In this case, the rectangle finder tool could characterize each of the lines first by a polarity (which side is dark and which side is light), then consider only those four-line combinations that correspond to the required polarity. This would have the effect of dramatically decreasing the number of combinations of lines considered in the subsequent steps.

It may also be possible to limit the length and width of the rectangles to be found. In this case, only line pairs separated by an appropriate distance would be considered.

Finally, it may be possible to prune the number of four-line combinations for which rectangles with high scores are unlikely to emerge by applying various heuristics. For example, when considering a particular pair of lines, one could separately project the boundary data objects contributing to the two lines onto either of the lines, then compute a one-dimensional correlation of the projections. If the correlation is low, then the line pair need not be considered. This pruning follows because boundary points for the opposite side of a rectangle would project onto substantially the same range, yielding a high correlation.

The equation that defines the best lines chosen in Act 404 is based merely on the set of boundary data objects that the line traverses, by using, for example, least-squares fitting. In Act 405, rectangle finding tool 22 refines these lines to lines that are consistent with edges in a rectangle. Specifically, for the best sets of boundary data objects in the primary direction, rectangle finder 22 begins by finding the best-fit lines, in the least squares sense, through the best set of boundary data objects. This produces a set of very accurate primary lines that may not be quite parallel with one another. The primary lines are made parallel by computing the average slope of these lines and then, for each primary line, constructing a new primary line that has the computed average slope and which passes through the centroid of the contributing boundary data objects. At this point, all of the primary lines are parallel.

To refine the best sets of boundary data objects in the secondary direction, the rectangle finder tool 22 begins by computing the slope of the secondary lines as the negative reciprocal of the computed average primary slope. The new secondary lines are then constructed as the secondary lines with this slope and passing through the centroid of the contributing boundary data objects of each secondary line. At this point, the secondary lines are as precise as possible given the constraint that they must be orthogonal to the primary lines.

Figure 5C:
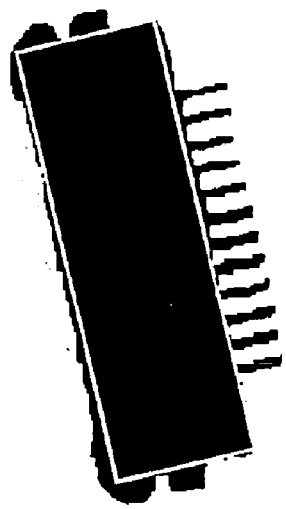
FIG. 5C is an image of a generally rectangular object, including a rectangle fit to the object.

As described above, rectangle finder tool 22 locates and characterizes rectangles in a plane that are at a predefined orientation. FIG. 5C is an image of object 301 and the corresponding rectangle located for this object.

One use for rectangle finder tool 22 is in automatically generating the best-fit rectangle, such as the rectangle shown in FIG. 5C, for a generally rectangular shaped device such as an SMD. The length, width, and orientation of the best-fit rectangle can be used as an abstract model for training any of a number of well known object location algorithms to find the SMD in succeeding run-time images.

Figure 7:
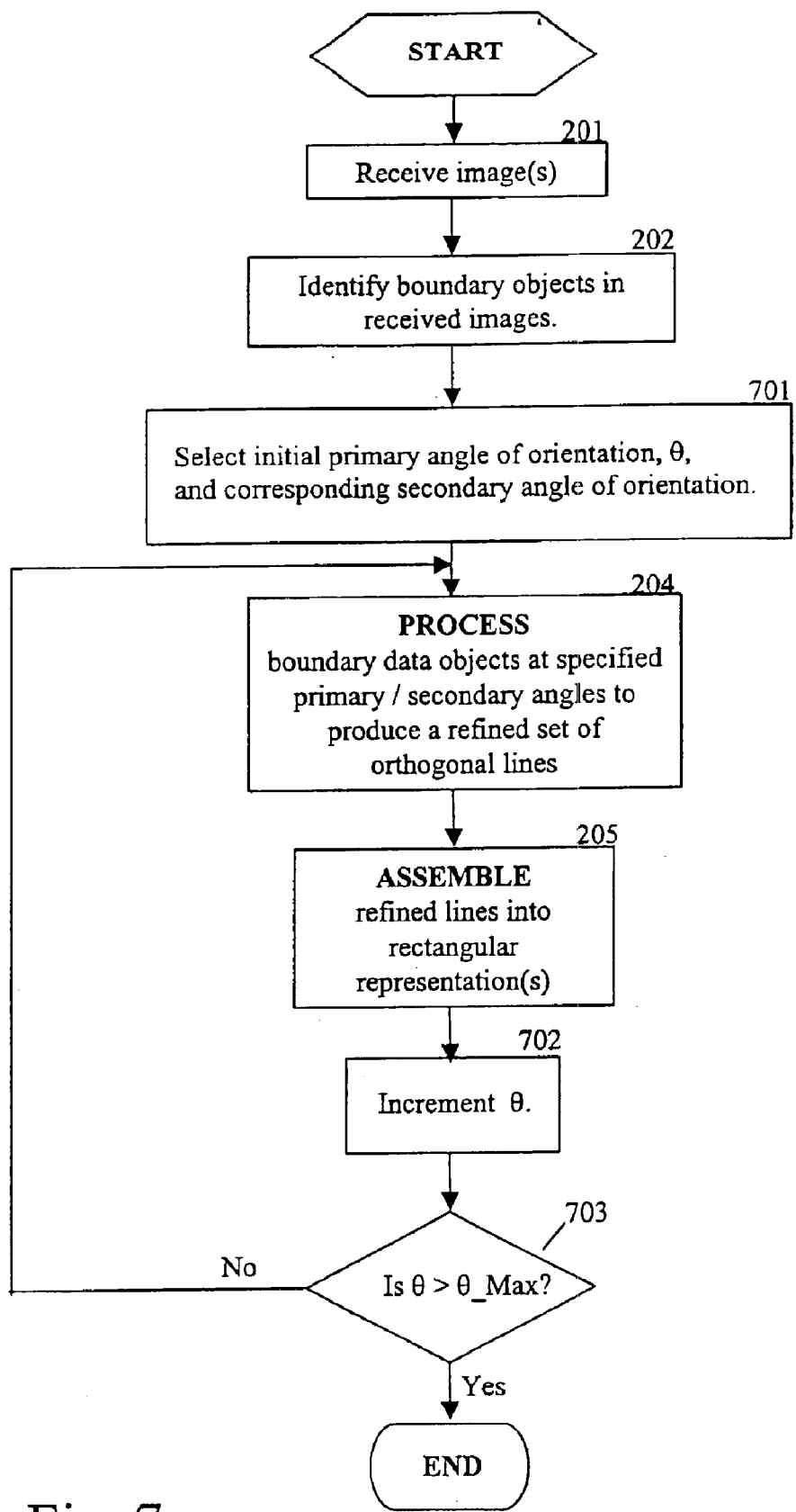
FIG. 7 is a flow chart illustrating a second embodiment of the rectangle finder tool for locating rectangles in a plane positioned at multiple orientations.

FIG. 7 is a flow chart illustrating a second embodiment of rectangle finder tool 22 for locating rectangles in a plane positioned at any orientation. The method of this embodiment is similar to the embodiment illustrated in FIG. 2, except that the primary/secondary angle selection step is repeated multiple times with the angle of orientation being incremented at each repetition.

More specifically, as in the method of FIG. 2, an image is received and boundary objects identified (Acts 201 and 202). Next, a primary angle of orientation, $\Theta$, is initially selected (e.g., $\Theta$). (Act 701). The secondary angle of orientation is, by definition, orthogonal to $\Theta$. The boundary data objects in the image are then processed in the manner described in Act 204, shown in FIG. 2. That is, the boundary data objects are processed to obtain a refined set of orthogonal lines (assuming appropriate orthogonal lines are present). The orthogonal lines are then assembled into rectangles as performed in Act 205. It is possible that no rectangular shaped objects exist at the selected angle of orientation. In this situation, no rectangles are returned in Act 205.

The angle of orientation is next incremented, and Acts 204 and 205 are iteratively repeated for all angles of interest. (Acts 702 and 703). For example, $\Theta$ may be iteratively incremented by one degree through the angle range 0 to 90 degrees ($\Theta\_Max=90$ degrees). In this manner, rectangle finder tool 22 locates all rectangular shaped objects, no matter what their orientation, in the input set of boundary data objects.

The above described techniques for locating and characterizing rectangles is particularly advantageous as it requires no prior knowledge of the device (i.e., size, polarity, orientation), it is relatively insensitive to fighting variations (e.g. front-lit or backlit) when implemented using gradient-based edge chains, and it is insensitive to multiple deviations from a simple rectangular pattern (e.g., leads, mounting tabs, connector ejector handles). Additionally, the technique is relatively insensitive to multiple visual features in the interior of the device body (such as solder balls, textual print, and heat sinks) and produces a description of the device that is guaranteed to be rectangular.

It will be apparent to one of ordinary skill in the art that the embodiments as described above may be implemented in many different embodiments of software, firmware, and hardware in the entities illustrated in the figures. The actual software code or specialized control hardware used to implement the present invention is not limiting of the present invention. Thus, the operation and behavior of the embodiments were described without specific reference to the specific software code or specialized hardware components, it being understood that a person of ordinary skill in the art would be able to design software and control hardware to implement the embodiments based on the description herein.

The foregoing description of preferred embodiments of the present invention provides illustration and description, but is not intended to be exhaustive or to limit the invention to the precise form disclosed. Modifications and variations are possible consistent with the above teachings or may be acquired from practice of the invention. The scope of the invention is defined by the claims and their equivalents.

What is claimed:

1. A method for locating and characterizing a generally rectangular-shaped object in an image by creating an abstract rectangular model of the generally-rectangular shaped object, the method comprising:

receiving an image;

identifying boundary data objects in the image, each boundary data object representing a single point in the image having a quantified location and orientation;

selecting, using the boundary data objects, a primary angle that describes a potential orientation of an abstract rectangular model of the generally rectangular shaped object in the image, the abstract rectangular model having four sides;

finding a first set of lines defined by groups of boundary data objects that lie generally along the direction of the primary angle;

finding a second set of lines defined by groups of boundary data objects that lie generally along a direction orthogonal to the primary angle; and locating pairs of lines from the first set of lines, and pairs of lines from the second set of lines, that together form the four sides of the abstract model of the generally rectangular shaped object in the image.

2. The method of claim 1, wherein finding the first set of lines includes assigning a score value to each line in the first set of lines based on the likelihood that each said line corresponds to a side of the generally rectangular shaped object.

3. The method of claim 2, wherein the score value for each said line is computed based on the number of boundary data objects contributing to the line.

4. The method of claim 3, wherein the score values are used in locating the pairs of lines that form the four sides of the abstract rectangular model of the generally rectangular shaped object in the image.

5. The method of claim 1, wherein the act of locating pairs of lines from the first and second set of lines additionally includes refining the pair of lines from the first set of lines by re-calculating the pair of lines from the first set of lines as a first refined pair of lines having a slope equal to an average of the slopes of the unrefined pairs of lines.

6. The method of claim 5, wherein the act of locating pairs of lines from the second set of lines additionally includes refining the pair of lines from the second set of lines by re-calculating the pair of lines from the second set as a second refined pair of lines having a slope equal to the negative reciprocal of the slope of the first refined pair of lines.

7. The method of claim 1, further including:

successively incrementing the primary angle and repeating the acts of finding the first set of lines, finding the second set of lines, and locating the pairs of lines for each said increment of the primary angle, wherein abstract rectangular models of the generally rectangular shaped object are located in any of the increments of the primary angle.

8. A method for locating and characterizing a generally rectangular-shaped surface mounted device (SMD) in an image by creating an abstract rectangular model of the generally-rectangular shaped surface mounted device (SMD), the method comprising:

receiving an image of a surface mounted device (SMD) for a printed circuit board, the SMD having a generally rectangular shape;

automatically generating an abstract rectangular model of the SMD based on the received image, the abstract rectangular model including at least the length and width of dominant edges in the SMD that contribute to the rectangular shape of the SMD, including:

extracting boundary data objects in the image, each boundary data object representing a single point in the image having a quantified location and orientation;

selecting, using the boundary data objects, a primary angle that describes a potential orientation of the abstract rectangular model of the surface mounted device (SMD), the abstract rectangular model having four sides:

finding a first set of lines defined by groups of boundary data objects that lie generally alone the direction of the primary angle; and finding a second set of lines defined by groups of boundary data objects that lie generally alone a direction orthogonal to the primary angle; and locating pairs of lines from the first set of lines and pairs of lines from the second set of lines that together form the four sides of the abstract rectangular model of the surface mounted device (SMD); and training an object location algorithm, based on the generated abstract rectangular model, to locate the SMD in succeeding images.

9. The method of claim 8, wherein the abstract rectangular model additionally includes position and orientation information of the surface mounted device (SMD) in the received image.

10. A computer system for locating and characterizing a generally rectangular-shaped object in an image by creating an abstract rectangular model of the generally-rectangular shaped object, the computer system comprising:

a processor; and a computer memory, the computer memory containing at least one image of an object having a generally rectangular shape and containing computer instructions, which, when executed by the processor, identifies boundary data objects, based on the image of the object, at a primary angle and at an angle orthogonal to the primary angle, and locates pairs of parallel lines in each of the primary angle and the angle orthogonal to the primary angle; wherein the computer system identifies pairs of lines for forming an abstract rectangular model generally conforming to the rectangular shaped object.

11. The computer system of claim 10, further including an image formation unit connected to the processor and configured to generate the at least one image.

12. A computer readable medium containing computer instructions, that when executed by a processor, locates and characterizes a generally rectangular shaped object in an image by creating an abstract rectangular model of the generally rectangular shaped object, and thereby causing a processor to:

receive an image having at least one generally rectangular shaped object;

identify boundary data objects in the image, each boundary data object representing a single point in the image having a quantified location and orientation;

select, using the boundary data objects, a primary angle that describes a potential orientation of the abstract rectangular model of the at least one generally rectangular shaped object in the image;

find a first set of lines defined by groups of boundary data objects that lie generally along the direction of the primary angle;

find a second set of lines defined by groups of boundary data objects that lie generally along a direction orthogonal to the primary angle; and locate pairs of lines from the first set of lines and pairs of lines from the second set of lines that together form the four sides of the abstract rectangular model of the at least one generally rectangular shaped object in the image.

13. The computer readable medium of claim 12, wherein finding the first set of lines includes assigning a score value to each line in the first set of lines based on the likelihood that each said line corresponds to a side of the generally rectangular shaped object.

14. The computer readable medium of claim 13, wherein the score value for each said line is computed based on the number of boundary data objects contributing to the line.

15. The computer readable medium of claim 14, wherein the score values are used in locating the pairs of lines that form the four sides of the abstract rectangular model of the generally rectangular shaped object in the image.

16. The computer readable medium of claim 12, wherein the act of locating pairs of lines from the first and second set of lines additionally includes refining the pair of lines from the first set of lines by re-calculating the pair of lines from the first set of lines as a first refined pair of lines having a slope equal to an average of the slopes of the unrefined pairs of lines.

17. The computer readable medium of claim 16, wherein the act of locating pairs of lines from the second set of lines additionally includes refining the pair of lines from the second set of lines by re-calculating the pair of lines from the second set as a second refined pair of lines having a slope equal to the negative reciprocal of the slope of the first refined pair of lines.

18. The computer readable medium of 12, the computer instructions further causing processor to:

successively increment the primary angle and repeating the acts of finding the first set of lines, finding the second set of lines, and locating the pairs of lines for each said increment of the primary angle, wherein abstract rectangular models of the generally rectangular shaped object are located in any of the increments of the primary angle.

* * * * *